US006215257B1

(12) United States Patent
Choe

(10) Patent No.: US 6,215,257 B1
(45) Date of Patent: Apr. 10, 2001

(54) APPARATUS FOR CORRECTING MISCONVERGENCE AND GEOMETRIC DISTORTION OF DEFLECTION YOKE

(75) Inventor: Hwan Seok Choe, Kyungki-Do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 09/212,322

(22) Filed: Dec. 15, 1998

(30) Foreign Application Priority Data

Dec. 17, 1997 (KR) .............................................. P97-69652

(51) Int. Cl.[7] ...................................................... G09G 1/28
(52) U.S. Cl. ...................................... 315/368.28; 315/370
(58) Field of Search ................................ 315/368.28, 370, 315/368.25, 368.26, 368.27, 391, 399; 313/426, 440, 409, 413, 421, 427, 428, 431, 437

(56) References Cited

U.S. PATENT DOCUMENTS

| | | | |
|---|---|---|---|
| 3,930,185 | * 12/1975 | Barkow et al. ....................... | 315/370 |
| 4,677,349 | * 6/1987 | Ruby ..................................... | 315/368 |
| 5,227,692 | * 7/1993 | Lee ....................................... | 313/431 |
| 5,274,308 | * 12/1993 | Park et al. ............................ | 315/368.26 |
| 5,408,159 | * 4/1995 | Maillot et al. ....................... | 313/440 |
| 5,523,658 | * 6/1996 | Fukuma et al. ...................... | 315/368.19 |
| 5,719,542 | * 2/1998 | Park et al. ............................ | 335/213 |

FOREIGN PATENT DOCUMENTS

| 08190876 | 7/1996 | (JP) | ................................ H01J/29/76 |
|---|---|---|---|

OTHER PUBLICATIONS

Patent Abstracts of Japan of JP 08190876 of Jul. 1996.

\* cited by examiner

*Primary Examiner*—Seungsook Ham
*Assistant Examiner*—Shun Lee
(74) *Attorney, Agent, or Firm*—Ladas & Parry

(57) ABSTRACT

An apparatus for correcting a misconvergence and geometric distortion of a deflection yoke, comprising a generally conical coil separator having a neck part and screen part, a left vertical deflection coil and right vertical deflection coil disposed respectively on the left and right portions of the outer surface of the screen part, first to sixth coma precoils disposed respectively on the left upper portion, right upper portion, left lower portion, right lower portion, left middle portion and right middle portion of the neck part via E-shaped iron pieces in such a manner that they can generate 6-pole magnetic fields, the coma precoils being electrically connected to the left and right vertical deflection coils, a distortion adjustment unit for controlling the relative amounts of current flowing respectively through the left and right vertical deflection coils to adjust a geometric distortion on a screen, a first misconvergence adjustment unit for controlling the relative amounts of current flowing respectively through the fifth and sixth coma precoils to adjust a vertical misconvergence on the screen, and a second misconvergence adjustment unit for controlling the relative amounts of current flowing respectively through the first and second coma precoils and third and fourth coma precoils to adjust a horizontal misconvergence on the screen.

33 Claims, 12 Drawing Sheets right magnetic field stronger left magnetic field=right magnetic field left magnetic field stronger right magnetic field stronger left magnetic field=right magnetic field left magnetic field stronger

APPARATUS FOR CORRECTING MISCONVERGENCE AND GEOMETRIC DISTORTION OF DEFLECTION YOKE

BACKGROUND OF THE INVENTION

1. Field of the Invention

The present invention relates in general to a deflection yoke, and more particularly to an apparatus for correcting a misconvergence and geometric distortion of the deflection yoke.

2. Description of the Prior Art

FIG. 1 shows the construction of a conventional cathode ray tube (referred to hereinafter as CRT). In this drawing, the reference numeral 100 denotes the CRT and 10 denotes a deflection yoke which is mounted on a neck 110 of the CRT 100. This deflection yoke 10 is generally classified into a saddle-saddle type as shown in FIGS. 2a and 2b and a saddle-toroidal type as shown in FIGS. 3a and 3b according to the wound forms of coils. The deflection yoke 10 acts to deflect electron beams emitted from a BGR electron gun 120, installed in the neck 110 of the CRT 100, left, right, upward and downward, in order to impact them on their accurate positions of a phosphor screen of the CRT 100.

FIGS. 2a and 2b show the construction of a conventional deflection yoke of the saddle-saddle type. As shown in these drawings, horizontal deflection coils 12 of the saddle type are disposed respectively on the upper and lower portions of the inner surface of a screen part of a generally conical coil separator 11, and vertical deflection coils 13 of the saddle type are disposed respectively on the left and right portions of the outer surface of the screen part. A generally cylindrical ferrite core 14 is provided on the outer surface of the screen part of the coil separator 11 to reinforce magnetic fields of the vertical deflection coils 13. Coma precoils 15 are externally mounted on a neck part of the coil separator 11 to correct comae generated by the vertical deflection coils 13.

FIGS. 3a and 3b show the construction of a conventional deflection yoke of the saddle-toroidal type. As shown in these drawings, horizontal deflection coils 12 of the saddle type are disposed respectively on the upper and lower portions of the inner surface of a screen part of a generally conical coil separator 11, and a generally cylindrical ferrite core 14 is provided on the outer surface of the screen part. Vertical deflection coils 16 of the toroidal type are provided respectively on the upper and lower portions of the ferrite core 14. Coma precoils 15 are externally mounted on a neck part of the coil separator 11 to correct comae generated by the vertical deflection coils 16. The vertical deflection coils 16 are mechanically wound on the upper and lower portions of the ferrite core 14 and are electrically connected in series to one another in order of the left upper portion (16a-1), left lower portion (16a-2), right upper portion (16b-1) and right lower portion (16b-2) as shown in FIG. 3c.

In the deflection yoke of the saddle-saddle type as shown in FIGS. 2a and 2b, there is a difference between the left and right magnetic fields due to relative disseminations and/or relative current amounts of the left and right vertical deflection coils 13a and 13b. This magnetic field difference results in the occurrence of a misconvergence and geometric distortion (G/D) on the screen.

Similarly, in the deflection yoke of the saddle-toroidal type as shown in FIGS. 3a and 3b, there is a difference between the left and right magnetic fields due to relative disseminations and/or relative current amounts of the vertical deflection coils 16a wound on the left upper and left lower portions of X-Y coordinates and the vertical deflection coils 16b wound on the right upper and right lower portions of the X-Y coordinates. Similarly, this magnetic field difference results in the occurrence of a misconvergence and geometric distortion (G/D) on the screen.

The misconvergence is generally classified into a YV misconvergence and a YHC misconvergence. The YV misconvergence represents a vertical misconvergence where horizontal lines of red color R diverge from horizontal lines of blue color B on the upper and lower portions of the Y axis of the screen, as shown in FIGS. 4a and 4c. The YHC misconvergence represents a horizontal misconvergence where a vertical line R and a vertical line B cross each other as shown in FIG. 5. The G/D represents a distorted state on the screen as shown in FIGS. 6a and 6c. Especially, FIGS. 6a and 6c show trapezoid distortions.

FIG. 7 is a circuit diagram of a conventional circuit for correcting a YV misconvergence of the deflection yoke of the saddle-saddle type shown in FIGS. 2a and 2b. As shown in this drawing, the left and right vertical deflection coils 13a and 13b are electrically connected in series to each other. A differential shunt circuit is connected in parallel to the left and right vertical deflection coils 13a and 13b. This differential shunt circuit is provided with two fixed resistors 21a and 21b and a variable resistor 22.

In the conventional YV misconvergence correction circuit shown in FIG. 7, the relative amounts of current flowing respectively through the left and right vertical deflection coils 13a and 13b are controlled by adjusting a resistance of the variable resistor 22. As a result, the left and right relative magnetic fields are adjusted to adjust the YV misconvergence as shown in FIGS. 4a or 4c in such a manner that the R and B lines can be converged as shown in FIG. 4b.

FIG. 8 is a circuit diagram of a conventional circuit for correcting a YV misconvergence of the deflection yoke of the saddle-toroidal type shown in FIGS. 3a and 3b. As shown in this drawing, the left upper vertical deflection coil (16a-1), left lower vertical deflection coil (16a-2), right upper vertical deflection coil (16b-1) and right lower vertical deflection coil (16b-2) are sequentially connected in series. A differential shunt circuit is connected in parallel to the left upper and left lower vertical deflection coils 16a and the right upper and right lower vertical deflection coils 16b. This differential shunt circuit is provided with two fixed resistors 21a and 21b and a variable resistor 22.

In the conventional YV misconvergence correction circuit shown in FIG. 8, in a similar manner to that shown in FIG. 7, the relative amounts of current flowing respectively through the left upper and left lower vertical deflection coils 16a and the right upper and right lower vertical deflection coils 16b are controlled by adjusting a resistance of the variable resistor 22. As a result, the left and right relative magnetic fields are adjusted to adjust the YV misconvergence as shown in FIGS. 4a or 4c in such a manner that the R and B lines can be converged as shown in FIG. 4b.

However, when the YV misconvergence is corrected in the deflection yoke of the saddle-saddle type and/or saddle-toroidal type, a G/D pattern as well as a convergence pattern is varied simultaneously with the convergence pattern according to a variation in the left and right magnetic fields resulting from a variation in the relative amounts of current flowing respectively through the left vertical deflection coil 13a or 16a and the right vertical deflection coil 13b or 16b. For this reason, a new G/D occurs although the YV misconvergence has been corrected. Further, even when the variable resistor 22 is not varied, the G/D generally occurs due to a difference between disseminations of the left and right vertical deflection coils which occurs upon winding them. Namely, because of a dissemination difference resulting from a winding unbalance of the coils and mechanical assembling thereof, it is substantially very difficult that the coils wound at the first to fourth upper limits of the X-Y coordinates generate completely symmetrical magnetic fields. For this reason, due to a dissemination unbalance, the G/D may occur as shown in FIGS. 6a or 6c although the misconvergence has completely been corrected as shown in FIG. 4b. Further, the misconvergence may occur as shown in FIGS. 4a or 4c although the G/D has completely been corrected as shown in FIG. 6b. As a result, the conventional YV misconvergence correction circuits in FIGS. 7 and 8 are disadvantageous in that the misconvergence and G/D cannot simultaneously be corrected as shown in FIGS. 4b and 6b.

In the case where the deflection yoke is used for a television receiver, the G/D becomes no great issue due to a moving picture display characteristic of the television screen. As a result, the convergence is adjusted in preference to the G/D by the circuits shown in FIGS. 7 and 8. However, a precise still picture has recently been required in monitors of personal computers. This thus requires a deflection yoke capable of more precisely correcting the convergence and G/D characteristics.

SUMMARY OF THE INVENTION

Therefore, the present invention has been made in view of the above problem, and it is an object of the present invention to provide an apparatus for correcting a misconvergence and G/D of a deflection yoke, in which the G/D as well as a YV misconvergence can be corrected.

In a feature of the present invention, the misconvergence is corrected by adjusting magnetic fields of coma precoils, and the G/D is corrected by adjusting magnetic fields of vertical deflection coils, thereby obtaining a magnetic field characteristic approximate to a symmetry.

More particularly, as shown in FIG. 9, the adjustment in intensity of magnetic fields of vertical deflection coils 13 or 16 provided on a screen part of a deflection yoke 10 has a great effect on a G/D characteristic because a deflection distance z1 on a z-axis, based on the vertical deflection coils 13 or 16, is large. Because the orbit of electron beams is nearly in the form of a parabolic function, a deflection amount is increased as the electron beams are advanced from a neck to a screen, resulting in a great effect on the G/D characteristic. The adjustment in intensity of magnetic fields of coma precoils 15 provided on a neck part of the deflection yoke 10 has little effect on the G/D characteristic because a deflection distance z2 on the z-axis, based on the coma precoils 15, is relatively much smaller than the deflection distance z1 based on the vertical deflection coils 13 or 16 provided on the screen part. But, because the coma precoils 15 are positioned far from the screen part and near to a BGR electron gun 120, even a small variation in their magnetic fields has a great effect on a convergence characteristic on the basis of a characteristic of the electron beams.

Therefore, the present invention has been made in view of the above G/D and convergence characteristic variations based on the deflection yoke, and it is an object of the present invention to provide an apparatus for correcting a misconvergence and G/D of the deflection yoke, in which the misconvergence is corrected by adjusting magnetic fields of coma precoils, and the G/D is corrected by adjusting magnetic fields of vertical deflection coils.

In accordance with one aspect of the present invention, there is provided an apparatus for correcting a misconvergence and geometric distortion of a deflection yoke, comprising a generally conical coil separator having a neck part and screen part; an upper horizontal deflection coil and lower horizontal deflection coil disposed respectively on the upper and lower portions of the inner surface of the screen part of the coil separator in such a manner that they can electrically be connected to each other; a left vertical deflection coil and right vertical deflection coil disposed respectively on the left and right portions of the outer surface of the screen part of the coil separator in such a manner that they can electrically be connected to each other; a generally cylindrical ferrite core disposed on the outer surface of the screen part of the coil separator to reinforce magnetic fields of the left and right vertical deflection coils; coma precoils disposed on the neck part of the coil separator in such a manner that they can electrically be connected to the left and right vertical deflection coils, the coma precoils generating pin-cushion magnetic fields to offset barrel magnetic fields generated by the left and right vertical deflection coils; misconvergence adjustment means for controlling the relative amounts of current flowing respectively through left ones of the coma precoils and right ones of the coma precoils to adjust left and right relative magnetic fields so as to adjust a vertical misconvergence on the screen; and distortion adjustment means for controlling the relative amounts of current flowing respectively through the left and right vertical deflection coils to adjust left and right relative magnetic fields so as to adjust a geometric distortion on a screen.

The misconvergence and geometric distortion correction apparatus further comprises a pair of iron pieces disposed respectively on the left and right portions of the outer surface of the neck part of the coil separator in such a manner that they can be opposite to each other, each of the iron pieces having its upper, middle and lower portions integrally formed, the coma precoils including left upper, left middle and left lower coma precoils electrically connected to one another via the left iron piece, and right upper, right middle and right lower coma precoils electrically connected to one another via the right iron piece. Preferably, the iron pieces are E-shaped.

The misconvergence and geometric distortion correction apparatus further comprises second misconvergence adjustment means for controlling the relative amounts of current flowing respectively through upper ones of the coma precoils and lower ones of the coma precoils to adjust upper and lower relative magnetic fields so as to adjust a horizontal misconvergence on the screen.

The first misconvergence adjustment means is adapted to control the relative amounts of current flowing respectively through a left middle one of the coma precoils and a right middle one of the coma precoils to adjust the left and right relative magnetic fields.

The second misconvergence adjustment means is adapted to control the relative amounts of current flowing respectively through left upper and right upper ones of the coma precoils and left lower and right lower ones of the coma precoils to adjust the upper and lower relative magnetic fields.

In accordance with another aspect of the present invention, there is provided an apparatus for correcting a misconvergence and geometric distortion of a deflection yoke, comprising a generally conical coil separator having a neck part and screen part; an upper horizontal deflection coil and lower horizontal deflection coil disposed respectively on the upper and lower portions of the inner surface of the screen part of the coil separator in such a manner that they can electrically be connected to each other; a generally cylindrical ferrite core disposed on the outer surface of the screen part of the coil separator; left upper and left lower vertical deflection coils and right upper and right lower vertical deflection coils disposed on the ferrite core in such a manner that they can electrically be connected to each other to generate left and right vertical deflection magnetic fields; coma precoils disposed on the neck part of the coil separator in such a manner that they can electrically be connected to the left and right vertical deflection coils, the coma precoils generating pin-cushion magnetic fields to offset barrel magnetic fields generated by the left and right vertical deflection coils; misconvergence adjustment means for controlling the relative amounts of current flowing respectively through left ones of the coma precoils and right ones of the coma precoils to adjust left and right relative magnetic fields so as to adjust a vertical misconvergence on the screen; and distortion adjustment means for controlling the relative amounts of current flowing respectively through the left upper and left lower vertical deflection coils and the right upper and right lower vertical deflection coils to adjust left and right relative magnetic fields so as to adjust a geometric distortion on a screen.

The misconvergence and geometric distortion correction apparatus further comprises a pair of iron pieces disposed respectively on the left and right portions of the outer surface of the neck part of the coil separator in such a manner that they can be opposite to each other, each of the iron pieces having its upper, middle and lower portions integrally formed, the coma precoils including left upper, left middle and left lower coma precoils electrically connected to one another via the left iron piece, and right upper, right middle and right lower coma precoils electrically connected to one another via the right iron piece. Preferably, the iron pieces are E-shaped.

The misconvergence and geometric distortion correction apparatus further comprises second misconvergence adjustment means for controlling the relative amounts of current flowing respectively through upper ones of the coma precoils and lower ones of the coma precoils to adjust upper and lower relative magnetic fields so as to adjust a horizontal misconvergence on the screen.

The first misconvergence adjustment means is adapted to control the relative amounts of current flowing respectively through a left middle one of the coma precoils and a right middle one of the coma precoils to adjust the left and right relative magnetic fields.

The second misconvergence adjustment means is adapted to control the relative amounts of current flowing respectively through left upper and right upper ones of the coma precoils and left lower and right lower ones of the coma precoils to adjust the upper and lower relative magnetic fields.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 10:
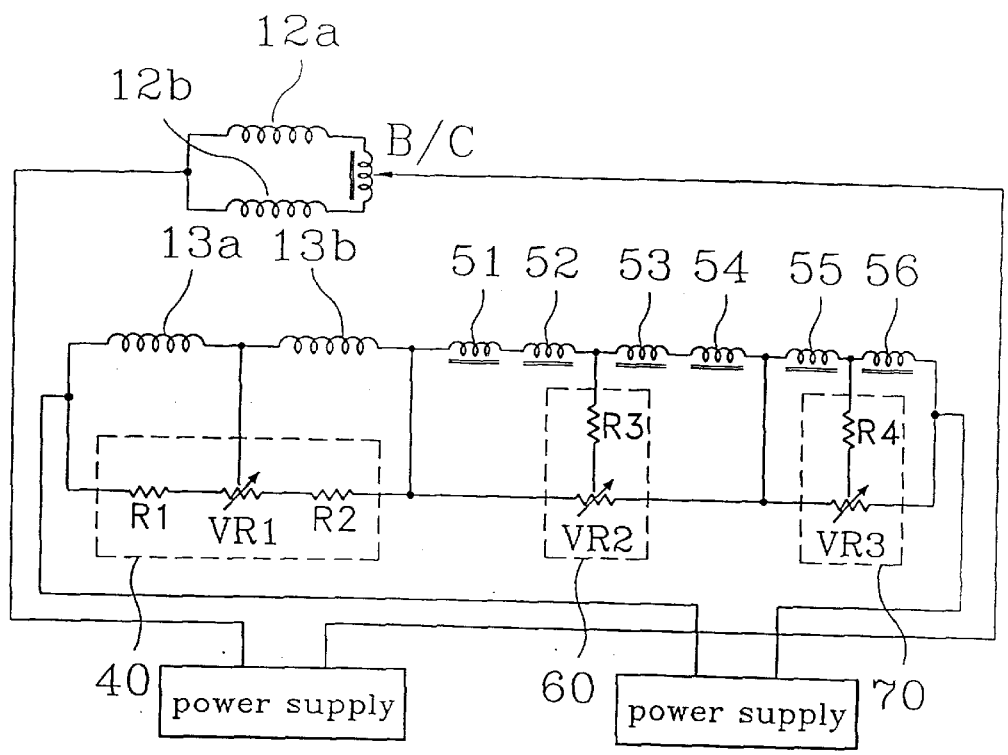
FIG. 10 is a circuit diagram of an apparatus for correcting a misconvergence and G/D of the deflection yoke of the saddle-saddle type in accordance with an embodiment of the present invention.

FIG. 10 is a circuit diagram of an apparatus for correcting a misconvergence and G/D of a deflection yoke of the saddle-saddle type in accordance with an embodiment of the present invention.

As shown in FIG. 10, a left vertical deflection coil 13a and a right vertical deflection coil 13b are electrically connected in series to each other. These vertical deflection coils 13a and 13b are disposed respectively on the left and right portions of the outer surface of a screen part of a coil separator 11. A differential shunt circuit 40 is connected in parallel to the left and right vertical deflection coils 13a and 13b. This differential shunt circuit 40 is provided with a first fixed resistor R1, a first variable resistor VR1 and a second fixed resistor R2 which are sequentially connected in series. The first variable resistor VR1 has a movable electrode terminal connected to a common node of the first and second vertical deflection coils. The differential shunt circuit 40 acts to control the relative amounts of current flowing respectively through the left and right vertical deflection coils 13a and 13b to adjust a G/D on a screen.

Figure 1:
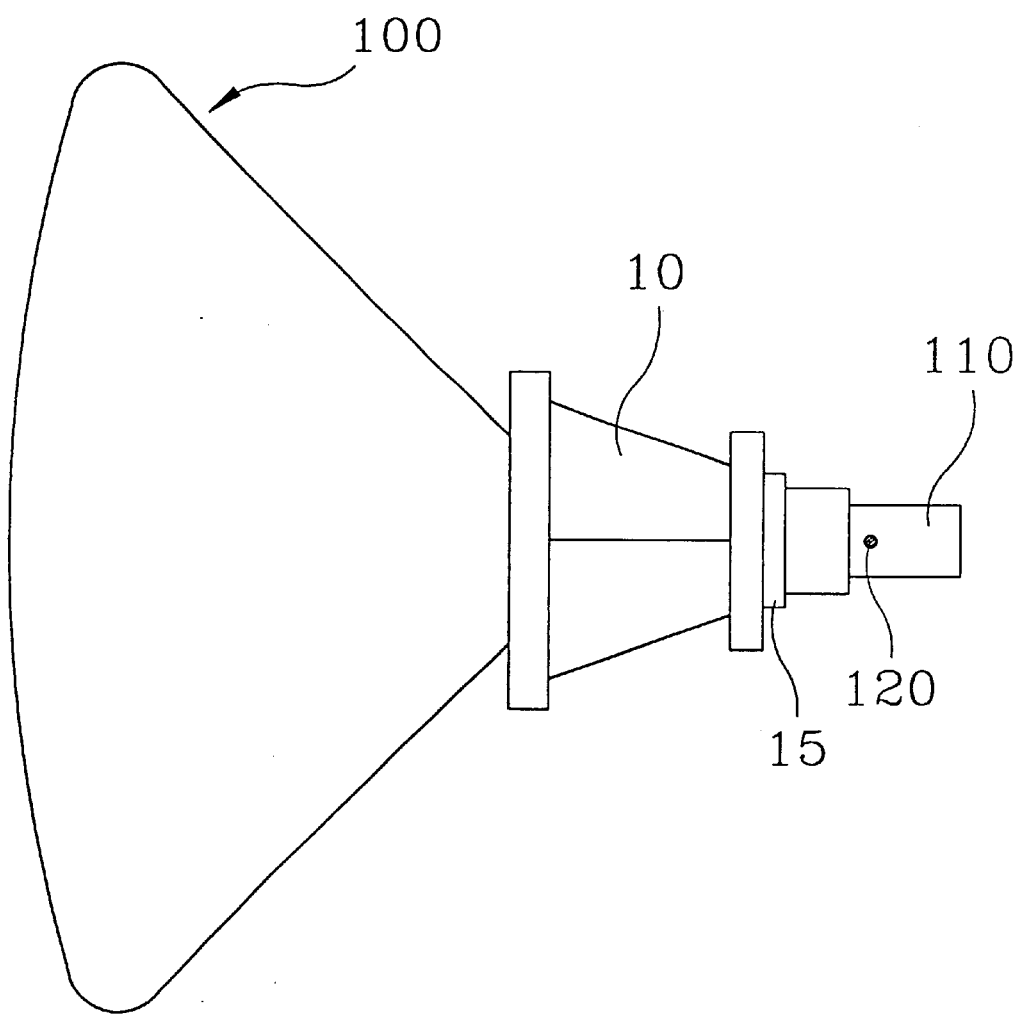
FIG. 1 is a side view showing the construction of a conventional CRT.
Figure 2A:
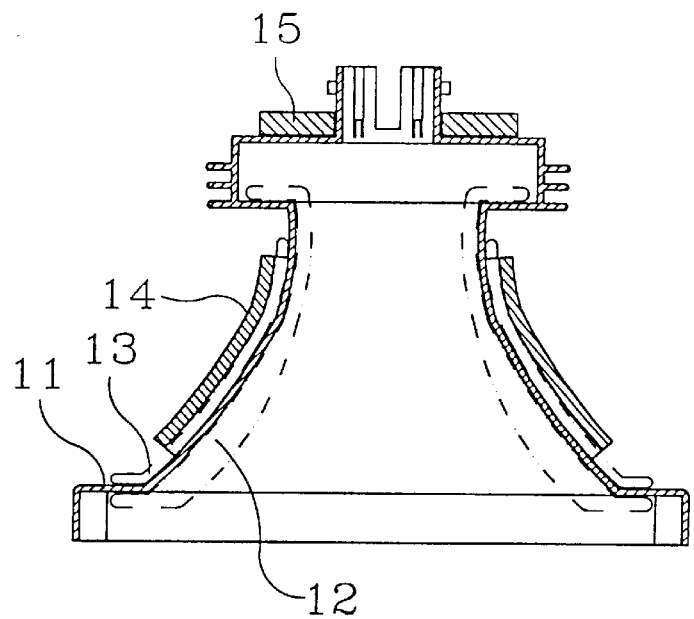
FIG. 2a is a longitudinal sectional view of a conventional deflection yoke of the saddle-saddle type.
Figure 2B:
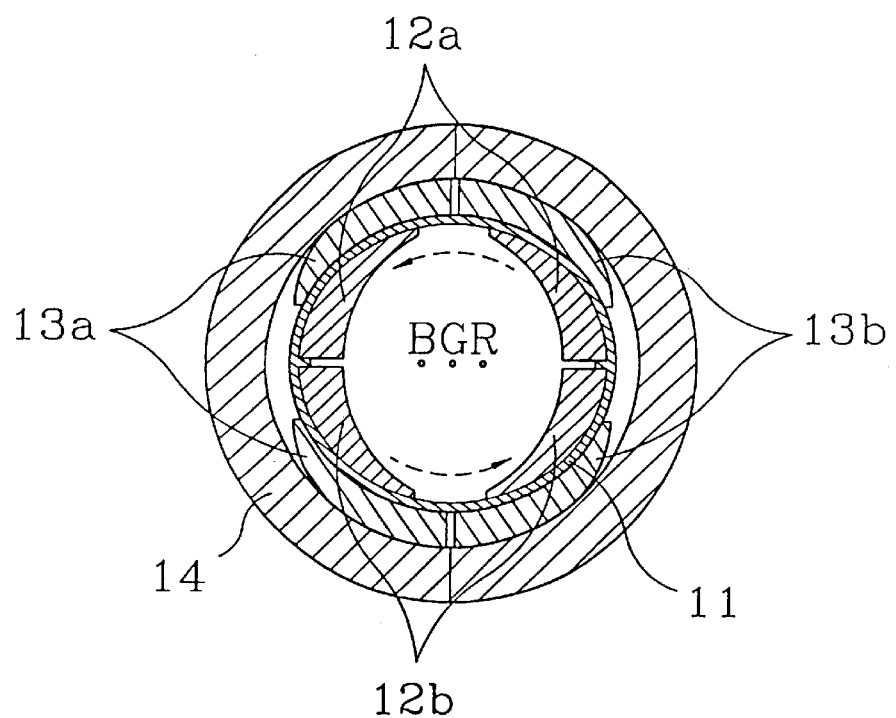
FIG. 2b is a cross sectional view of the conventional deflection yoke of the saddle-saddle type.
Figure 3A:
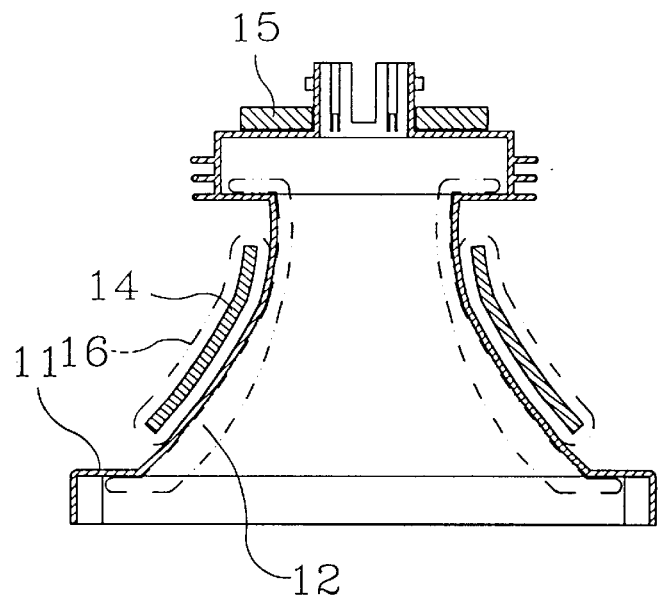
FIG. 3a is a longitudinal sectional view of a conventional deflection yoke of the saddle-toroidal type.
Figure 3B:
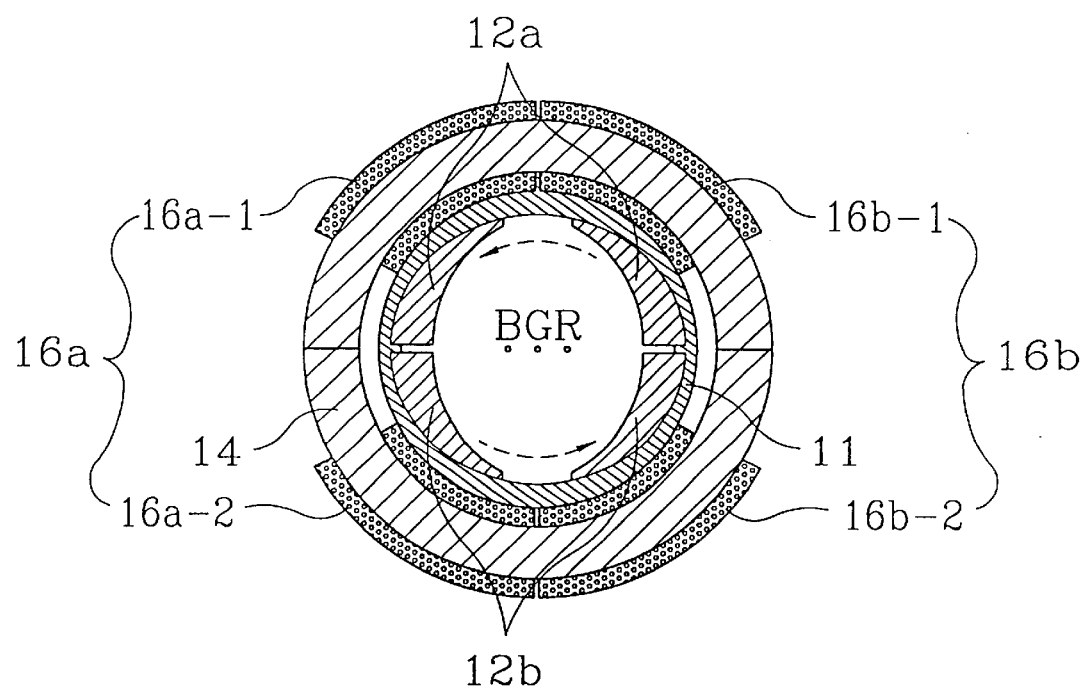
FIG. 3b is a cross sectional view of the conventional deflection yoke of the saddle-toroidal type.
Figure 3C:
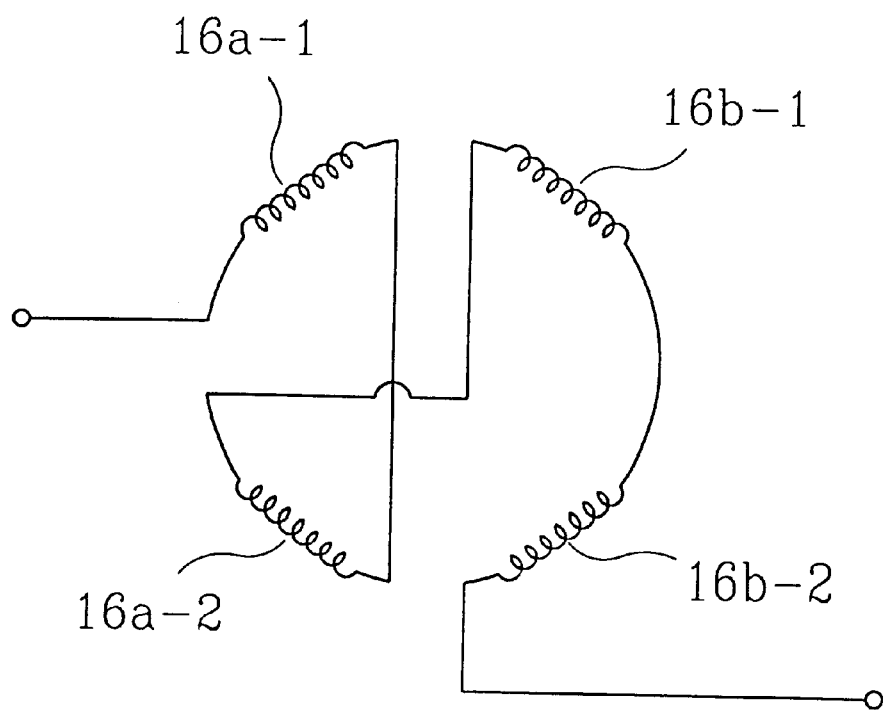
FIG 3c is a schematic illustration of the order in which deflection coils are connected on the conventional deflection yolk of FIGS. 3a and 3b.
Figure 11A:
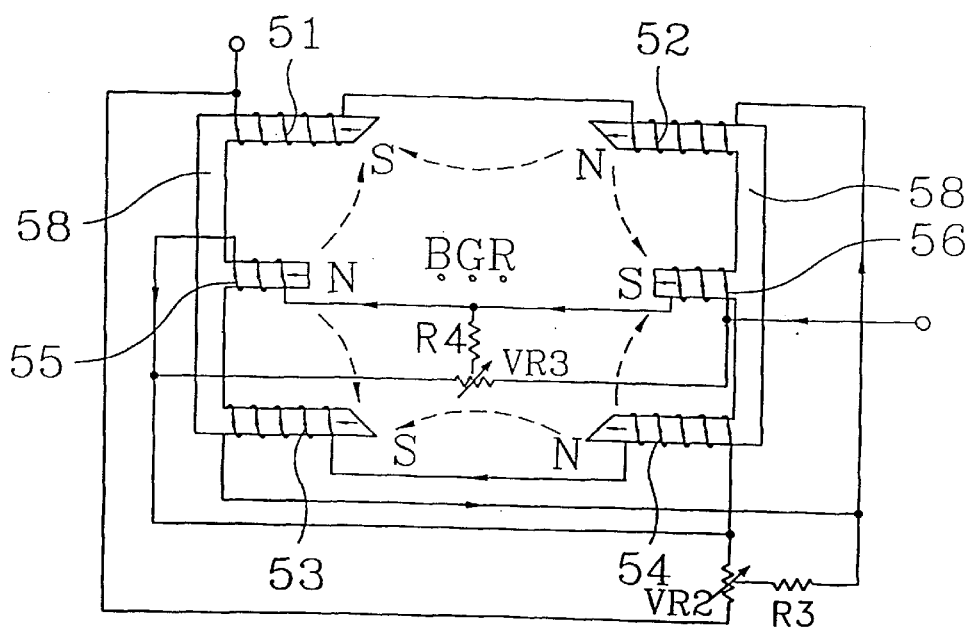
FIGS. 11a and 11b are views showing the construction of coma precoils in accordance with the present invention.
Figure 11B:
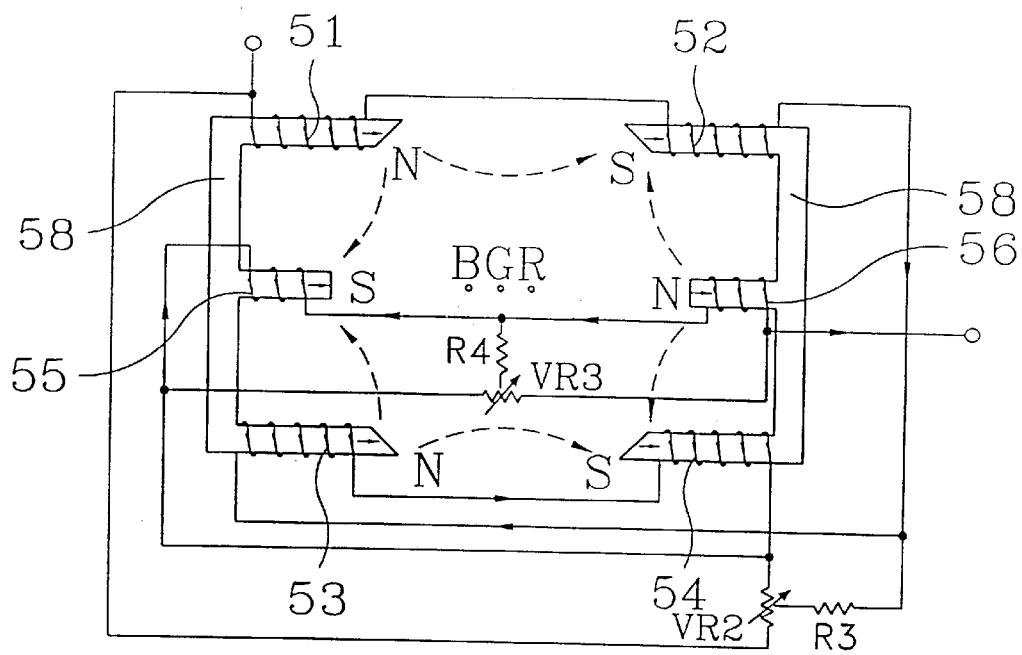
Figure 12:
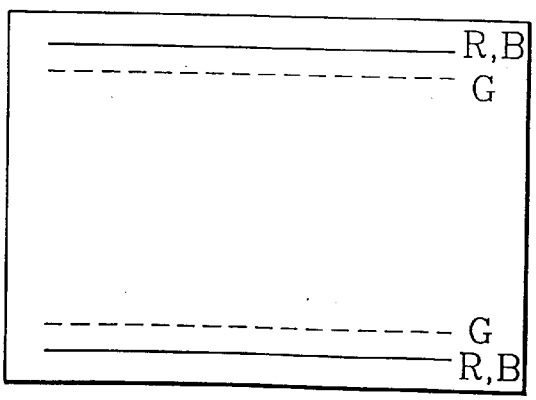
FIG. 12 is a view illustrating a pattern on the screen based on barrel magnetic fields of vertical deflection coils.

First to sixth coma precoils 51–56 are electrically connected in series to the left and right vertical deflection coils 13a and 13b. As shown in FIGS. 11a and 11b, the coma precoils 51–56 are sequentially wound on the left upper portion, right upper portion, left lower portion, right lower portion, left middle portion and right middle portion of a neck part of the coil separator via E-shaped iron pieces to generate 6-pole magnetic fields for correction of a coma aberration. Because magnetic fields of the vertical deflection coils 13a and 13b are generally of a barrel form as shown by the arrows in FIG. 2b, the sensitivity of a G beam, which is remoter from the magnetic fields than R and B beams, is lowered when the beams are deflected upward and downward. This causes a coma where the G beam is misconverged from the R and B beams as shown in FIG. 12. For this reason, the coma precoils 51–56 shown in FIGS. 11a and 11b are used to generate pin-cushion magnetic fields as indicated by dotted arrows to offset the barrel magnetic fields of the vertical deflection coils 13a and 13b. As a result, the G beam is raised in sensitivity so that it can be converged with the R and B beams. Preferably, the coma precoils 51–56 are wound in the same direction. Alternatively, the upper coma precoils 51 and 52 and the lower coma precoils 53 and 54 may be wound in the same direction and the middle coma precoils 55 and 56 may be wound in the opposite directions. In the former, if the magnetic field of the middle coma precoil 55 or 56 is strengthened, the magnetic fields of the upper coma precoil 51 or 52 and lower coma precoil 53 or 54 are offset so that they can relatively be weakened. For example, if the magnetic field of the left middle coma precoil 55 is strengthened, the magnetic fields of the left upper and left lower coma precoils 51 and 53 are weakened and the magnetic fields of the right upper and right lower coma precoils 52 and 54 are relatively strengthened. In the latter, the magnetic fields are generated in the opposite manner to those in the former. For reference, FIG. 11a shows current directions and magnetic field directions in the downward deflection, and FIG. 11b shows current directions and magnetic field directions in the upward deflection. That is, the current and magnetic field directions in the upward and downward deflections are opposite to each other.

Referring again to FIG. 10, a YHC misconvergence adjustment unit 60 is connected in parallel to the first to fourth coma precoils 51–54. This YHC misconvergence adjustment unit 60 acts to control the relative amounts of current flowing respectively through the first and second coma precoils 51 and 52 and the third and fourth coma precoils 53 and 54 to adjust a horizontal misconvergence YHC on the screen. To this end, the YHC misconvergence adjustment unit 60 includes a second variable resistor VR2 connected in parallel to the first to fourth coma precoils 51–54, and a third fixed resistor R3 connected between a common node of the second and third coma precoils 52 and 53 and a movable electrode terminal of the second variable resistor VR2.

A YV misconvergence adjustment unit 70 is connected in parallel to the fifth and sixth coma precoils 55 and 56. This YV misconvergence adjustment unit 70 acts to control the relative amounts of current flowing respectively through the fifth coma precoil 55 and the sixth coma precoil 56 to adjust a vertical misconvergence YV on the screen. To this end, the YV misconvergence adjustment unit 70 includes a third variable resistor VR3 connected in parallel to the fifth and sixth coma precoils 55 and 56, and a fourth fixed resistor R4 connected between a common node of the fifth and sixth coma precoils 55 and 56 and a movable electrode terminal of the third variable resistor VR3.

An upper horizontal deflection coil 12a and a lower horizontal deflection coil 12b are connected in parallel to each other. A balance coil B/C is provided to vary the relative magnetic fields of the upper and lower horizontal deflection coils 12a and 12b.

Preferably, the first and second resistors R1 and R2 are about 80–120 Ohm, the third resistor R3 is about 2.0–2.4 Ohm and the fourth resistor R4 is about 0.3–0.7 Ohm.

Further, preferably, the first variable resistor VR1 is about 80–120 Ohm, the second variable resistor VR2 is about 18–22 Ohm and the third variable resistor VR3 is about 18–22 Ohm.

Figure 6A:
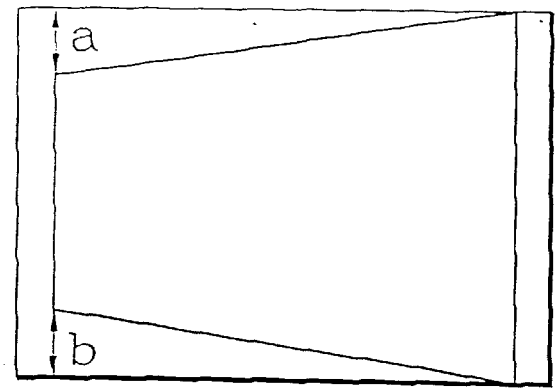
FIGS. 6a–6c are views illustrating G/D patterns on the screen.
Figure 6B:
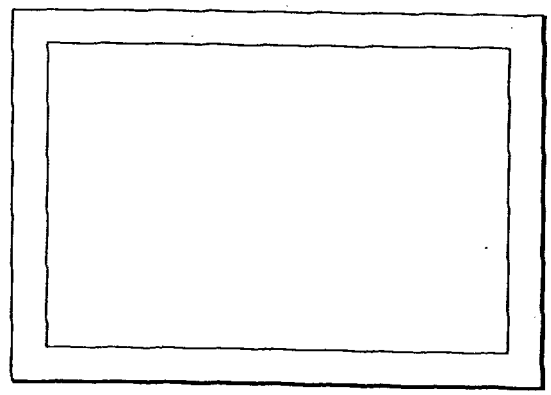
Figure 6C:
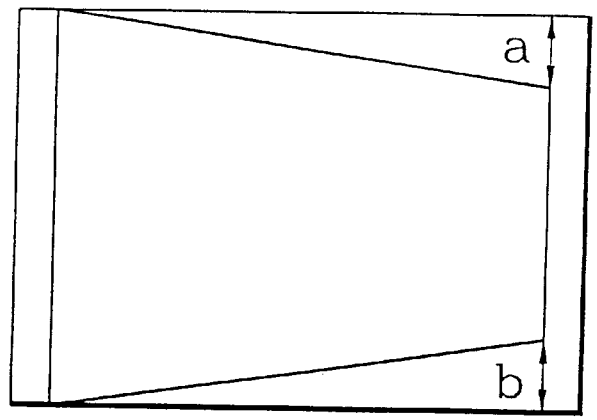
Figure 7:
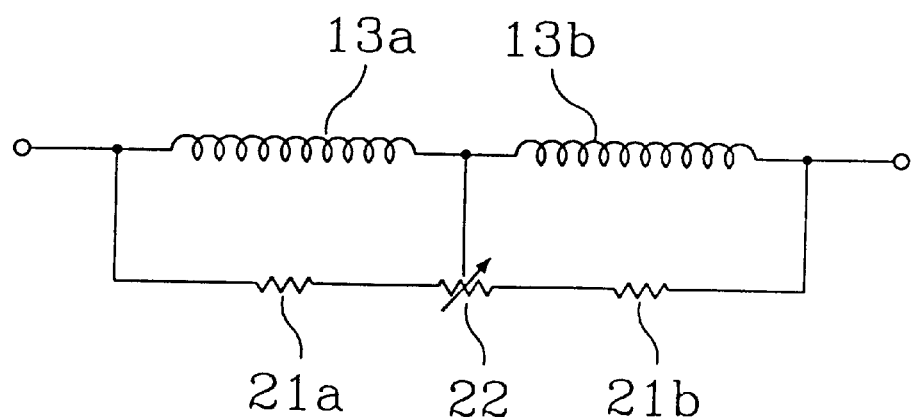
FIG. 7 is a circuit diagram of a conventional circuit for correcting a YV misconvergence of the deflection yoke of the saddle-saddle type.
Figure 8:
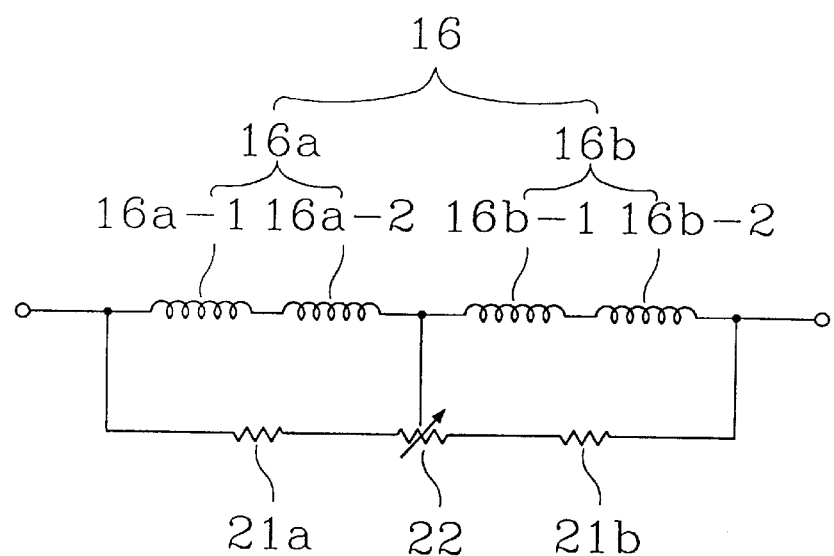
FIG. 8 is a circuit diagram of a conventional circuit for correcting a YV misconvergence of the deflection yoke of the saddle-toroidal type.
Figure 9:
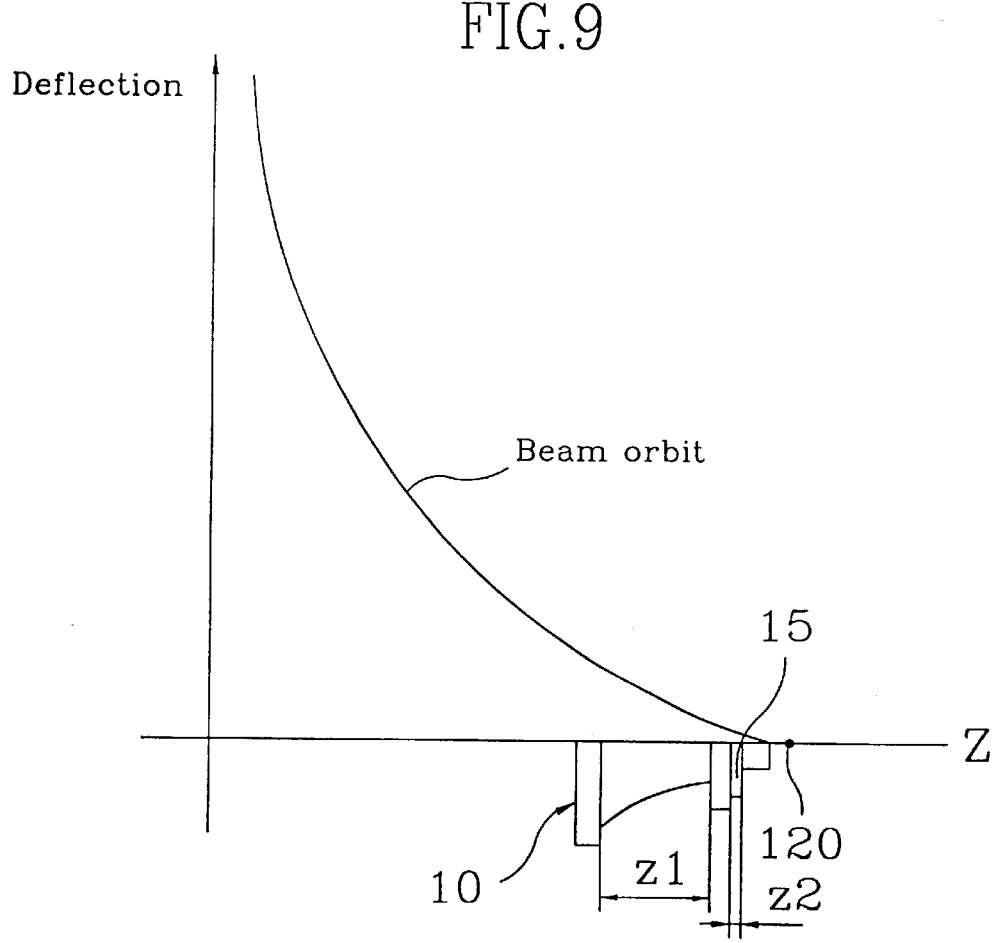
FIG. 9 is a view illustrating the relation between a beam orbit and a deflection amount based on a deflection yoke.

In the preferred embodiment of the present invention, the maximum variable value (for example, (a+b)/2 in FIGS. 6a and 6c) for the G/D correction by the distortion adjustment unit 40 is about 1 mm, which is about twice the conventional maximum variable value. Further, the maximum variable value (for example, (c+d)/2 in FIGS. 4a and 4c) for the YV misconvergence correction by the misconvergence adjustment unit 70 is about 0.8mm, where little G/D variation occurs.

The operation of the misconvergence and G/D correction apparatus with the above-mentioned construction in accordance with the embodiment of the present invention will hereinafter be described in detail.

First, in the case where the G/D occurs as shown in FIG. 6a because the right magnetic field from the right vertical deflection coil 13b is stronger than the left magnetic field from the left vertical deflection coil 13a, the resistance of the first variable resistor VR1 is varied to increase the amount of current flowing through the left vertical deflection coil 13a so as to relatively reinforce the left deflection magnetic field. As a result, the right magnetic field from the right vertical deflection coil 13b and the left magnetic field from the left vertical deflection coil 13a become the same so that the G/D can be corrected as shown in FIG. 6b.

In the case where the G/D occurs as shown in FIG. 6c because the left magnetic field from the left vertical deflection coil 13a is stronger than the right magnetic field from the right vertical deflection coil 13b, the resistance of the first variable resistor VR1 is varied to increase the amount of current flowing through the right vertical deflection coil 13b so as to relatively reinforce the right deflection magnetic field. As a result, the left magnetic field from the left vertical deflection coil 13a and the right magnetic field from the right vertical deflection coil 13b become the same so that the G/D can be corrected as shown in FIG. 6b.

Figure 5:
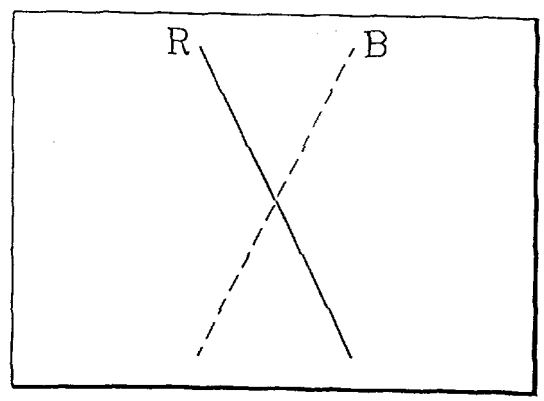
FIG. 5 is a view illustrating a YHC misconvergence pattern on the screen.

In this manner, the G/D is corrected by using the first variable resistor VR1. The YHC misconvergence as shown in FIG. 5 is corrected by relatively varying the amounts of current flowing respectively through the first and second coma precoils 51 and 52 and the third and fourth coma precoils 53 and 54 on the basis of the second variable resistor VR2. FIG. 5 shows the YHC misconvergence in the case where the upper deflection magnetic field is stronger because the amount of current flowing through the first and second coma precoils 51 and 52 is relatively large. In this case, if the resistance of the second variable resistor VR2 is varied to increase the amount of current flowing through the third and fourth coma precoils 53 and 54, the upper deflection magnetic field and the lower deflection magnetic field become the same, resulting in the YHC misconvergence being corrected. On the other hand, in the case where the lower deflection magnetic field is stronger, the YHC misconvergence is corrected by adjusting the resistance of the second variable resistor VR2 in the opposite manner to that in the case where the upper deflection magnetic field is stronger.

In this manner, the G/D and YHC misconvergence are corrected by using the first variable resistor VR1 and second variable resistor VR2. The YV misconvergence as shown in FIGS. 4a or 4c is corrected by relatively varying the amounts of current flowing respectively through the fifth coma precoil 55 and the sixth coma precoil 56 on the basis of the third variable resistor VR3.

Figure 4A:
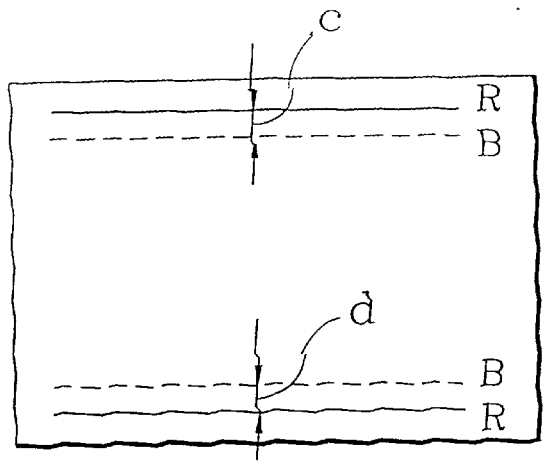
FIGS. 4a–4c are views illustrating YV misconvergence patterns on a screen.
Figure 4B:
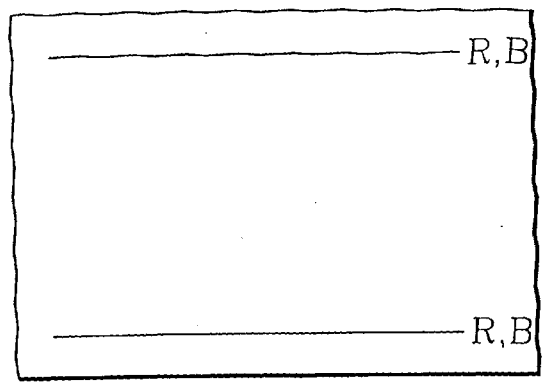

FIG. 4a shows the YV misconvergence in the case where the right magnetic field is stronger. In this case, the left magnetic field must relatively be reinforced. In this connection, the resistance of the third variable resistor VR3 is varied to increase the amount of current flowing through the sixth coma precoil 56 so as to relatively reinforce the corresponding magnetic field. At this time, if the first to sixth coma precoils 51–56 are all wound in the same direction, the strengthened magnetic field of the sixth coma precoil 56 offsets the magnetic fields of the right upper second coma precoil 52 and right lower fourth coma precoil 54. As a result, the right magnetic field is weakened and the left magnetic field is relatively strengthened. Consequently, the left magnetic field and the right magnetic field become the same so that the YV misconvergence can be corrected as shown in FIG. 4b.

Figure 4C:
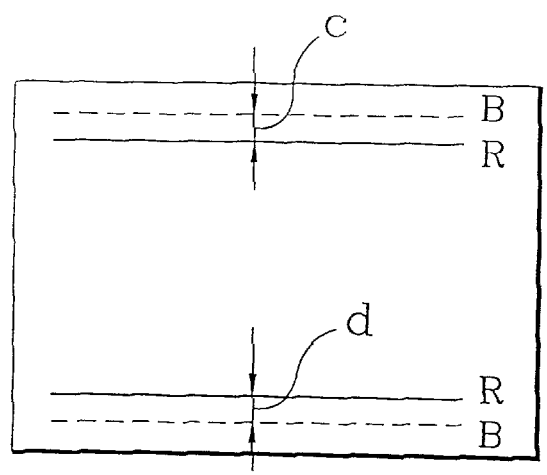

FIG. 4c shows the YV misconvergence in the case where the left magnetic field is stronger. In this case, the right magnetic field must relatively be reinforced. In this connection, the resistance of the third variable resistor VR3 is varied to increase the amount of current flowing through the fifth coma precoil 55 so as to relatively reinforce the corresponding magnetic field. At this time, if the first to sixth coma precoils 51–56 are all wound in the same direction, the 6-pole magnetic fields are generated via the E-shaped iron pieces as shown in FIGS. 11a and 11b. As a result, the strengthened magnetic field of the fifth coma precoil 55 offsets the magnetic fields of the left upper first coma precoil 51 and left lower third coma precoil 53, thereby causing the left magnetic field to become weaker than before being corrected and the right magnetic field to become relatively stronger than before being corrected. Consequently, the right magnetic field and the left magnetic field become the same so that the YV misconvergence can be corrected as shown in FIG. 4b.

Figure 13:
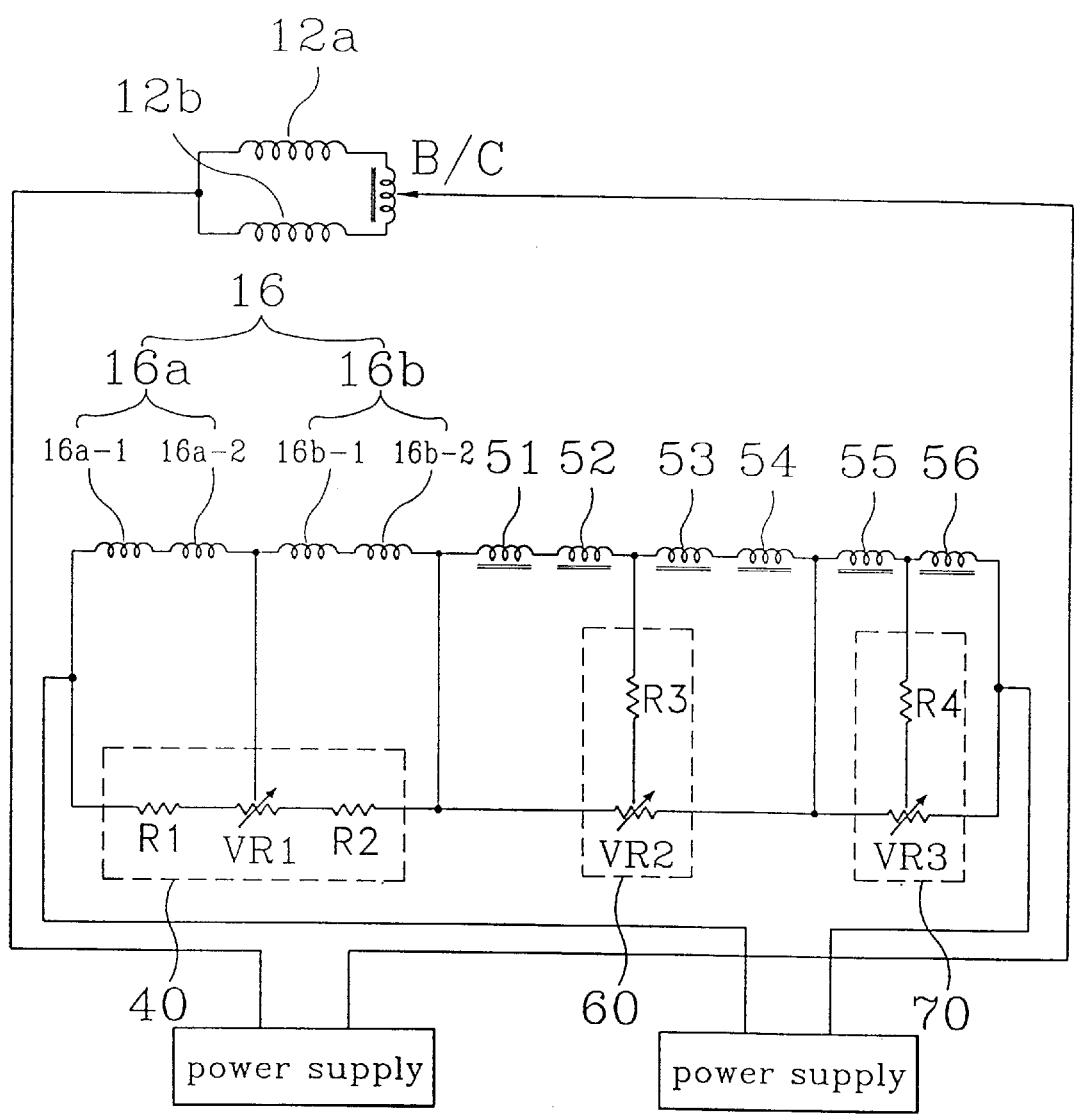
FIG. 13 is a circuit diagram of an apparatus for correcting a misconvergence and G/D of the deflection yoke of the saddle-toroidal type in accordance with an alternative embodiment of the present invention.

FIG. 13 is a circuit diagram of an apparatus for correcting a misconvergence and G/D of a deflection yoke of the saddle-toroidal type in accordance with an alternative embodiment of the present invention. The construction of the second embodiment in this drawing is substantially the same as that of the first embodiment in FIG. 10, except for vertical deflection coils. Therefore, a description will hereinafter be made only with respect to the vertical deflection coils.

As shown in FIG. 13, a left upper vertical deflection coil 16a-1, left lower vertical deflection coil 16a-2, right upper vertical deflection coil 16b-1 and right lower vertical deflection coil 16b-2 are sequentially connected in series. A G/D correction unit 40 is connected in parallel to the left upper and left lower vertical deflection coils 16a and the right upper and right lower vertical deflection coils 16b. This G/D correction unit 40 is provided with two fixed resistors R1 and R2 and a variable resistor VR1.

The G/D adjustment unit 40 in FIG. 13 is the same in construction as that in FIG. 10. Similarly to that in FIG. 10, the G/D adjustment unit 40 acts to vary the resistance of the variable resistor VR1 so as to control the relative amounts of current flowing respectively through the left upper and left lower vertical deflection coils 16a and the right upper and right lower vertical deflection coils 16b. As a result, the left and right relative magnetic fields are adjusted to correct the G/D as shown in FIGS. 6a or 6c. As the G/D is corrected, it appears as shown in FIG. 6b.

As apparent from the above description, according to the present invention, the G/D occurring on the screen can be corrected. Further, the misconvergence, occurring when the G/D is corrected, can perfectly be corrected. Therefore, the present invention has the effect of improving the quality of the deflection yoke.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for correcting a misconvergence and geometric distortion of a deflection yoke, comprising:

a generally conical coil separator having a neck part and screen part;

an upper horizontal deflection coil and lower horizontal deflection coil disposed respectively on the upper and lower portions of the inner surface of said screen part of said coil separator in such a manner that they can electrically be connected to each other;

a left vertical deflection coil and right vertical deflection coil disposed respectively on the left and right portions of the outer surface of said screen part of said coil separator in such a manner that they can electrically be connected to each other;

a generally cylindrical ferrite core disposed on said outer surface of said screen part of said coil separator to reinforce magnetic fields of said left and right vertical deflection coils;

coma precoils disposed on said neck part of said coil separator in such a manner that they can electrically be connected to said left and right vertical deflection coils, said coma precoils generating pin-cushion magnetic fields to offset barrel magnetic fields generated by said left and right vertical deflection coils;

distortion adjustment means for controlling the relative amounts of current flowing respectively through said left and right vertical deflection coils to adjust left and right relative magnetic fields so as to adjust a geometric distortion on a screen;

first misconvergence adjustment means for controlling the relative amounts of current flowing respectively through left ones of said coma precoils and right ones of said coma precoils to adjust left and right relative magnetic fields so as to adjust a vertical misconvergence on said screen; and second misconvergence adjustment means for controlling the relative amounts of current flowing respectively through upper ones of said coma precoils and lower ones of said coma precoils to adjust upper and lower relative magnetic fields so as to adjust a horizontal misconvergence on said screen.

2. An apparatus for correcting a misconvergence and geometric distortion of a deflection yoke, as set forth in claim 1, further comprising a pair of iron pieces disposed respectively on the left and right portions of the outer surface of said neck part of said coil separator in such a manner that they can be opposite to each other, each of said iron pieces having its upper, middle and lower portions integrally formed, said coma precoils including left upper, left middle and left lower coma precoils electrically connected to one another via said left iron piece, and right upper, right middle and right lower coma precoils electrically connected to one another via said right iron piece.

3. An apparatus for correcting a misconvergence and geometric distortion of a deflection yoke, as set forth in claim 1, wherein said distortion adjustment means includes a differential shunt circuit connected in parallel to said left and right vertical deflection coils.

4. An apparatus for correcting a misconvergence and geometric distortion of a deflection yoke, as set forth in claim 3, wherein said differential shunt circuit includes a first fixed resistor, a variable resistor and a second fixed resistor sequentially connected in series, said variable resistor having a movable electrode terminal connected to a common node of said left and right vertical deflection coils.

5. An apparatus for correcting a misconvergence and geometric distortion of a deflection yoke, as set forth in claim 1, wherein said first misconvergence adjustment means is adapted to control the relative amounts of current flowing respectively through a left middle one of said coma precoils and a right middle one of said coma precoils to adjust said left and right relative magnetic fields.

6. An apparatus for correcting a misconvergence and geometric distortion of a deflection yoke, as set forth in claim 5, wherein said first misconvergence adjustment means includes:
   a variable resistor connected in parallel to said left middle coma precoil and right middle coma precoil; and
   a fixed resistor connected between a common node of said left middle and right middle coma precoils and a movable electrode terminal of said variable resistor.

7. An apparatus for correcting a misconvergence and geometric distortion of a deflection yoke, as set forth in claim 1, wherein said second misconvergence adjustment means is adapted to control the relative amounts of current flowing respectively through left upper and right upper ones of said coma precoils and left lower and right lower ones of said coma precoils to adjust said upper and lower relative magnetic fields.

8. An apparatus for correcting a misconvergence and geometric distortion of a deflection yoke, as set forth in claim 7, wherein said second misconvergence adjustment means includes:
   a variable resistor connected in parallel to said left upper and right upper coma precoils and left lower and right lower coma precoils; and
   a fixed resistor connected between a common node of said right upper coma precoil and left lower coma precoil and a movable electrode terminal of said variable resistor.

9. An apparatus for correcting a misconvergence and geometric distortion of a deflection yoke, as set forth in claim 2, wherein said coma precoils are all wound in the same direction.

10. An apparatus for correcting a misconvergence and geometric distortion of a deflection yoke, as set forth in claim 2, wherein said left upper and right upper coma precoils and said left lower and right lower coma precoils are wound in the same direction and said left middle and right middle coma precoils are wound in the opposite directions.

11. An apparatus for correcting a misconvergence of a deflection yoke, comprising:
   a generally conical coil separator having a neck part and screen part;
   an upper horizontal deflection coil and lower horizontal deflection coil disposed respectively on the upper and lower portions of the inner surface of said screen part of said coil separator in such a manner that they can electrically be connected to each other;
   a left vertical deflection coil and right vertical deflection coil disposed respectively on the left and right portions of the outer surface of said screen part of said coil separator in such a manner that they can electrically be connected to each other;
   a generally cylindrical ferrite core disposed on said outer surface of said screen part of said coil separator to reinforce magnetic fields of said left and right vertical deflection coils;
   coma precoils disposed on said neck part of said coil separator in such a manner that they can electrically be connected to said left and right vertical deflection coils, said coma precoils generating pin-cushion magnetic fields to offset barrel magnetic fields generated by said left and right vertical deflection coils; and
   misconvergence adjustment means for controlling the relative amounts of current flowing respectively through left ones of said coma precoils and right ones of said coma precoils to adjust left and right relative magnetic fields so as to adjust a vertical misconvergence on a screen.

12. An apparatus for correcting a misconvergence of a deflection yoke, as set forth in claim 11, further comprising a pair of iron pieces disposed respectively on the left and right portions of the outer surface of said neck part of said coil separator in such a manner that they can be opposite to each other, each of said iron pieces having its upper, middle and lower portions integrally formed, said coma precoils including left upper, left middle and left lower coma precoils electrically connected to one another via said left iron piece, and right upper, right middle and right lower coma precoils electrically connected to one another via said right iron piece.

13. An apparatus for correcting a misconvergence of a deflection yoke, as set forth in claim 11, wherein said misconvergence adjustment means is adapted to control the relative amounts of current flowing respectively through a left middle one of said coma precoils and a right middle one of said coma precoils to adjust said left and right relative magnetic fields.

14. An apparatus for correcting a misconvergence of a deflection yoke, as set forth in claim 13, wherein said misconvergence adjustment means includes:
   a variable resistor connected in parallel to said left middle coma precoil and right middle coma precoil; and
   a fixed resistor connected between a common node of said left middle and right middle coma precoils and a movable electrode terminal of said variable resistor.

15. An apparatus for correcting a misconvergence of a deflection yoke, as set forth in claim 12, wherein said coma precoils are all wound in the same direction.

16. An apparatus for correcting a misconvergence of a deflection yoke, as set forth in claim 12, wherein said left upper and right upper coma precoils and said left lower and right lower coma precoils are wound in the same direction and said left middle and right middle coma precoils are wound in the opposite directions.

17. An apparatus for correcting a misconvergence and geometric distortion of a deflection yoke, comprising:
   a generally conical coil separator having a neck part and screen part;
   an upper horizontal deflection coil and lower horizontal deflection coil disposed respectively on the upper and lower portions of the inner surface of said screen part of said coil separator in such a manner that they can electrically be connected to each other;
   a left vertical deflection coil and right vertical deflection coil disposed respectively on the left and right portions of the outer surface of said screen part of said coil separator in such a manner that they can electrically be connected to each other;

a generally cylindrical ferrite core disposed on said outer surface of said screen part of said coil separator to reinforce magnetic fields of said left and right vertical deflection coils;

coma precoils disposed on said neck part of said coil separator in such a manner that they can electrically be connected to said left and right vertical deflection coils, said coma precoils generating pin-cushion magnetic fields to offset barrel magnetic fields generated by said left and right vertical deflection coils;

distortion adjustment means for controlling the relative amounts of current flowing respectively through said left and right vertical deflection coils to adjust left and right relative magnetic fields so as to adjust a geometric distortion on a screen; and misconvergence adjustment means for controlling the relative amounts of current flowing respectively through left ones of said coma precoils and right ones of said coma precoils to adjust left and right relative magnetic fields so as to adjust a vertical misconvergence on said screen.

18. An apparatus for correcting a misconvergence and geometric distortion of a deflection yoke, as set forth in claim 17, further comprising a pair of iron pieces disposed respectively on the left and right portions of the outer surface of said neck part of said coil separator in such a manner that they can be opposite to each other, each of said iron pieces having its upper, middle and lower portions integrally formed, said coma precoils including left upper, left middle and left lower coma precoils electrically connected to one another via said left iron piece, and right upper, right middle and right lower coma precoils electrically connected to one another via said right iron piece.

19. An apparatus for correcting a misconvergence and geometric distortion of a deflection yoke, as set forth in claim 17, wherein said distortion adjustment means includes a differential shunt circuit connected in parallel to said left and right vertical deflection coils.

20. An apparatus for correcting a misconvergence and geometric distortion of a deflection yoke, as set forth in claim 19, wherein said differential shunt circuit includes a first fixed resistor, a variable resistor and a second fixed resistor sequentially connected in series, said variable resistor having a movable electrode terminal connected to a common node of said left and right vertical deflection coils.

21. An apparatus for correcting a misconvergence and geometric distortion of a deflection yoke, as set forth in claim 17, wherein said misconvergence adjustment means is adapted to control the relative amounts of current flowing respectively through a left middle one of said coma precoils and a right middle one of said coma precoils to adjust said left and right relative magnetic fields.

22. An apparatus for correcting a misconvergence and geometric distortion of a deflection yoke, as set forth in claim 21, wherein said misconvergence adjustment means includes:

a variable resistor connected in parallel to said left middle coma precoil and right middle coma precoil; and a fixed resistor connected between a common node of said left middle and right middle coma precoils and a movable electrode terminal of said variable resistor.

23. An apparatus for correcting a misconvergence and geometric distortion of a deflection yoke, as set forth in claim 18, wherein said coma precoils are all wound in the same direction.

24. An apparatus for correcting a misconvergence and geometric distortion of a deflection yoke, as set forth in claim 18, wherein said left upper and right upper coma precoils and said left lower and right lower coma precoils are wound in the same direction and said left middle and right middle coma precoils are wound in the opposite directions.

25. An apparatus for correcting a misconvergence and geometric distortion of a deflection yoke, comprising:

a generally conical coil separator having a neck part and screen part;

an upper horizontal deflection coil and lower horizontal deflection coil disposed respectively on the upper and lower portions of the inner surface of said screen part of said coil separator in such a manner that they can electrically be connected to each other;

a generally cylindrical ferrite core disposed on the outer surface of said screen part of said coil separator;

left upper and left lower vertical deflection coils and right upper and right lower vertical deflection coils disposed on said ferrite core in such a manner that they can electrically be connected to each other to generate left and right vertical deflection magnetic fields;

coma precoils disposed on said neck part of said coil separator in such a manner that they can electrically be connected to said left and right vertical deflection coils, said coma precoils generating pin-cushion magnetic fields to offset barrel magnetic fields generated by said left and right vertical deflection coils; and misconvergence adjustment means for controlling the relative amounts of current flowing respectively through left ones of said coma precoils and right ones of said coma precoils to adjust left and right relative magnetic fields so as to adjust a vertical misconvergence on said screen.

26. An apparatus for correcting a misconvergence and geometric distortion of a deflection yoke, as set forth in claim 25, further comprising a pair of iron pieces disposed respectively on the left and right portions of the outer surface of said neck part of said coil separator in such a manner that they can be opposite to each other, each of said iron pieces having its upper, middle and lower portions integrally formed, said coma precoils including left upper, left middle and left lower coma precoils electrically connected to one another via said left iron piece, and right upper, right middle and right lower coma precoils electrically connected to one another via said right iron piece.

27. An apparatus for correcting a misconvergence and geometric distortion of a deflection yoke, as set forth in claim 25, wherein said misconvergence adjustment means is adapted to control the relative amounts of current flowing respectively through a left middle one of said coma precoils and a right middle one of said coma precoils to adjust said left and right relative magnetic fields.

28. An apparatus for correcting a misconvergence and geometric distortion of a deflection yoke, as set forth in claim 27, wherein said misconvergence adjustment means includes:

a variable resistor connected in parallel to said left middle coma precoil and right middle coma precoil; and a fixed resistor connected between a common node of said left middle and right middle coma precoils and a movable electrode terminal of said variable resistor.

29. An apparatus for correcting a misconvergence and geometric distortion of a deflection yoke, as set forth in claim 26, wherein said coma precoils are all wound in the same direction.

30. An apparatus for correcting a misconvergence and geometric distortion of a deflection yoke, as set forth in claim 26, wherein said left upper and right upper coma precoils and said left lower and right lower coma precoils are wound in the same direction and said left middle and right middle coma precoils are wound in the opposite directions.

31. An apparatus for correcting a misconvergence and geometric distortion of a deflection yoke, as set forth in claim 25, further comprising distortion adjustment means for controlling the relative amounts of current flowing respectively through said left upper and left lower vertical deflection coils and said right upper and right lower vertical deflection coils to adjust left and right relative magnetic fields so as to adjust a geometric distortion on a screen.

32. An apparatus for correcting a misconvergence and geometric distortion of a deflection yoke, as set forth in claim 25, further comprising second misconvergence adjustment means for controlling the relative amounts of current flowing respectively through upper ones of said coma precoils and lower ones of said coma precoils to adjust upper and lower relative magnetic fields so as to adjust a horizontal misconvergence on said screen.

33. An apparatus for correcting a misconvergence and geometric distortion of a deflection yoke, as set forth in claim 32, wherein said second misconvergence adjustment means is adapted to control the relative amounts of current flowing respectively through left upper and right upper ones of said coma precoils and left lower and right lower ones of said coma precoils to adjust said upper and lower relative magnetic fields.

* * * * *